UNITED STATES PATENT OFFICE.

THOR MEJDELL, OF CHRISTIANIA, NORWAY, ASSIGNOR TO A/S. LABRADOR, OF CHRISTIANIA, NORWAY, A BUSINESS ENTITY OF CHRISTIANIA, NORWAY.

PROCESS OF REMOVING IRON FROM SOLUTIONS CONTAINING ALUMINIUM.

1,421,804. Specification of Letters Patent. Patented July 4, 1922.

No Drawing. Application filed February 27, 1920. Serial No. 361,808.

*To all whom it may concern:*

Be it known that I, THOR MEJDELL, a subject of the King of Norway, and a resident of Christiania, Kingdom of Norway, have invented certain new and useful Improvements in the Process of Removing Iron from Solutions Containing Aluminium (for which application has been filed in Norway Feb. 22, 1919), of which the following is a specification.

This invention relates to the treatment of solutions containing both aluminium and iron, and has for its object a method whereby it is possible to obtain a precipitate of iron in aluminous solutions, which may easily be removed by means of filtration or decantation.

In the technical precipitation of iron from solutions of aluminium salts, only those precipitating agents will receive consideration which may be obtained at a reasonable price. Such agents are for example alumina, aluminium hydrate, various carbonates such as limestone, dolomite or bases like slaked or unslaked lime. If such precipitating agent is added to an aluminous solution, in which ferric iron is present, the acid liberated on account of the considerably hydrolytic decomposition of the aluminium salt will become neutralized and a precipitation of iron will take place.

I have found, however, that the precipitate obtained in the above described manner generally is very difficult to separate from the solution, as it is in a gelatinous state.

According to my present invention the iron may be precipitated in a form which is very well adapted for filtration. I obtain this result by only neutralizing a certain part of the acid liberated by hydrolysis. If the solution then is heated for some time to a comparatively high temperature, such as 80° C., the iron will precipitate in the form of a powder, which, if the neutralization has been carried out in the right way, contains all the iron of the solution, and may easily be removed by filtration.

I have made a series of experiments in order to determine the degree of neutralization necessary and the temperature required in order to obtain the iron in the desired form. I have found that the degree of neutralization necessary depends upon the concentration of the solution. A high concentration of alumina necessitates a more extensive neutralization than a low concentration of alumina.

At a definite concentration of alumina I have found the desirable degree of neutralization to be within comparatively narrow limits. Thus in an aluminium nitrate solution, containing 8 g. $Al_2O_3$ per 100 cc., the iron will be precipitated in the desired condition, well adapted for filtering, if I add so much of the precipitating agent that 2–10% of the total aluminium of the solution is present in the form of a basic compound, but dissolved in the nitrate solution, as may easily be determined by analysis. If I neutralize further the precipitation will take place more rapidly, but the precipitate will then be of a gelatinous character, difficult to filter.

When the aluminous solution used has an aluminium content different from 8 g. $Al_2O_3$ per 100 cc., the addition of neutralization agent must vary accordingly. Good results will, however, be obtained, when the acidity of the solution corresponds to that of a solution containing 8 g. $Al_2O_3$ per 100 cc., in which 2–10% of the total Al is present as a basic compound.

I have found that the precipitation of iron in the desired form may be considerably accelerated by adding to the solution an oxid of iron. It has been impossible to determine whether the action of such iron oxid is merely catalytic or if the oxid itself also acts as a precipitant, but I claim such addition of iron oxid as a part of my invention, regardless of the reactions actually taking place. The precipitated iron oxid or hydrated oxid may be used over again as a means of accelerating precipitation after having been washed to remove the mother liquor. I have found that heating above 600° C. partly deprives iron oxid of its qualities as an accelerating agent, and care should be taken when preparing the iron oxid not to exceed this temperature. Even a small amount of such iron oxid will considerably accelerate the precipitation, but as a rule the result will be better the more oxid is added.

In order to illustrate my invention I give below an example of the preferred way of carrying out my process:

To a solution of alumina containing about 8 g. $Al_2O_3$ per 100 cc., and about 2 g. $Fe_2O_3$ to each 100 g. of $Al_2O_3$ I add $CaCO_3$ until I obtain a solution in which 2% of the total aluminium is present as a basic compound, but dissolved in the nitrate solution. I further add 30 g. $Fe_2O_3$, obtained by decomposing ferric nitrate at 400° C., to each 1000 cc. of solution. I then heat the solution to boiling for about fifteen minutes, and remove the precipitate by settling or filtration. The filtrate will only contain a trace of iron. I carefully wash my precipitate, and dry it at 110° C. It is then ready for use again as an accelerating agent in the precipitation process.

The above example only refers to aluminium nitrate solutions, but my process may also be used for other aluminous solutions, the degree of neutralization varying according to the acid present and the concentration of the solution. The addition of iron oxid always shows the same beneficial effect as in nitrate solutions.

The foregoing detailed example has been given for clearness of understanding only, and no undue limitation should be deduced therefrom, but the appended claims should be construed as broadly as permissible in view of the prior art.

What I claim as new and desire to secure by Letters Patent of the United States is:

1. Process of removing iron from solutions containing an aluminium salt, which comprises adding a substance capable of neutralizing the acid liberated by hydrolysis in a quantity insufficient to neutralize all of said acid, and effecting precipitation of iron uncombined with other metals by heating.

2. Process of removing iron from solutions containing an aluminium salt, which comprises adding a substance capable of neutralizing the acid liberated by hydrolysis of the aluminium salt in a quantity insufficient to neutralize all acid liberated in said manner, and also adding an oxid of iron, heating the solution until precipitation takes place, and separating the precipitate from the solution.

3. Process of removing iron from solutions containing aluminium nitrate, which comprises adding a substance capable of neutralizing the acid liberated by hydrolysis of the aluminium nitrate in a quantity insufficient to neutralize all acid liberated in said manner, and effecting precipitation of iron from the solution.

4. Process of removing iron from solutions containing aluminium nitrate, which comprises adding a substance capable of neutralizing the acid liberated by hydrolysis of the aluminium nitrate in a quantity insufficient to neutralize all acid liberated in said manner, heating the solution until precipitation takes place, and separating the precipitate from the solution.

5. Process of removing iron from solutions containing aluminium nitrate, which comprises adding a substance capable of neutralizing the acid liberated by hydrolysis of the aluminium nitrate in a quantity insufficient to neutralize all acid liberated in said manner, and also adding an oxid of iron, and effecting precipitation of iron from the solution.

6. Process of removing iron from solutions containing aluminium nitrate, which comprises adding a substance capable of neutralizing the acid liberated by hydrolysis of the aluminium nitrate in a quantity insufficient to neutralize all acid liberated in said manner, and also adding an oxid of iron, heating the solution until precipitation takes place, and separating the precipitate from the solution.

7. Process of removing iron from solutions containing an aluminium salt and comprising about 8 g. $Al_2O_3$ per 100 cc., which comprises adding a substance capable of neutralizing the acid liberated by hydrolysis until more than 2 and less than 10% of such acid has been neutralized, and effecting precipitation of iron from the solution.

8. Process of removing iron from solutions containing aluminium nitrate, which comprises neutralizing the solution until the degree of neutralization corresponds to that of a solution containing about 8 g. $Al_2O_3$ per 100 cc., in which more than 2 and less than 10% of the acid liberated by hydrolysis has been neutralized, and effecting precipitation of iron from the solution.

9. Process of removing iron from solutions containing an aluminium salt and comprising about 8 g. $Al_2O_3$ per 100 cc., which comprises adding $CaCO_3$ until more than 2 and less than 10% of the acid liberated by hydrolysis has been neutralized, adding an oxid of iron, and effecting precipitation of iron from the solution.

10. Process of removing iron from solutions containing aluminium nitrate, which comprises neutralizing the solution until the degree of neutralization corresponds to that of a solution containing about 8 g. $Al_2O_3$ per 100 cc., in which more than 2 and less than 10% of the acid liberated by hydrolysis has been neutralized, adding an oxid of iron, and heating the solution until precipitation of iron takes place.

Signed at Christiania, Norway, this 5th day of February 1920.

THOR MEJDELL.